Dec. 5, 1961 — I. M. WHITE ET AL — 3,011,343
HYDRAULIC FLOW INDICATOR
Filed Oct. 21, 1957 — 3 Sheets-Sheet 1
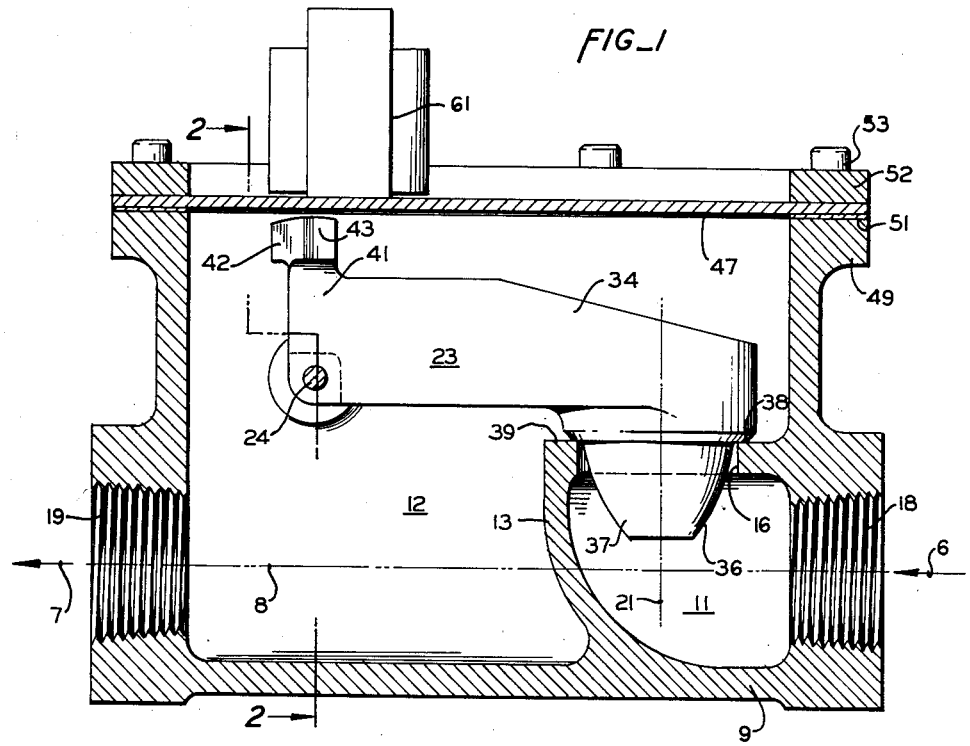
FIG_1
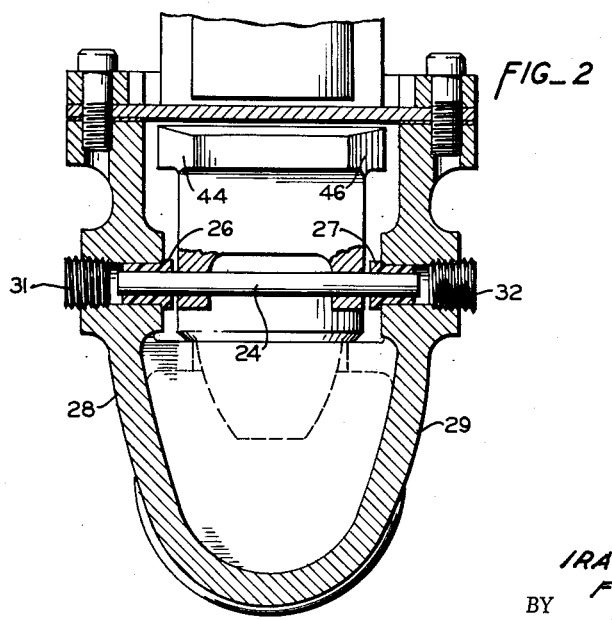
FIG_2
INVENTORS
IRA MORGAN WHITE
FRED H. RUED
BY Lothrop & West
ATTORNEYS

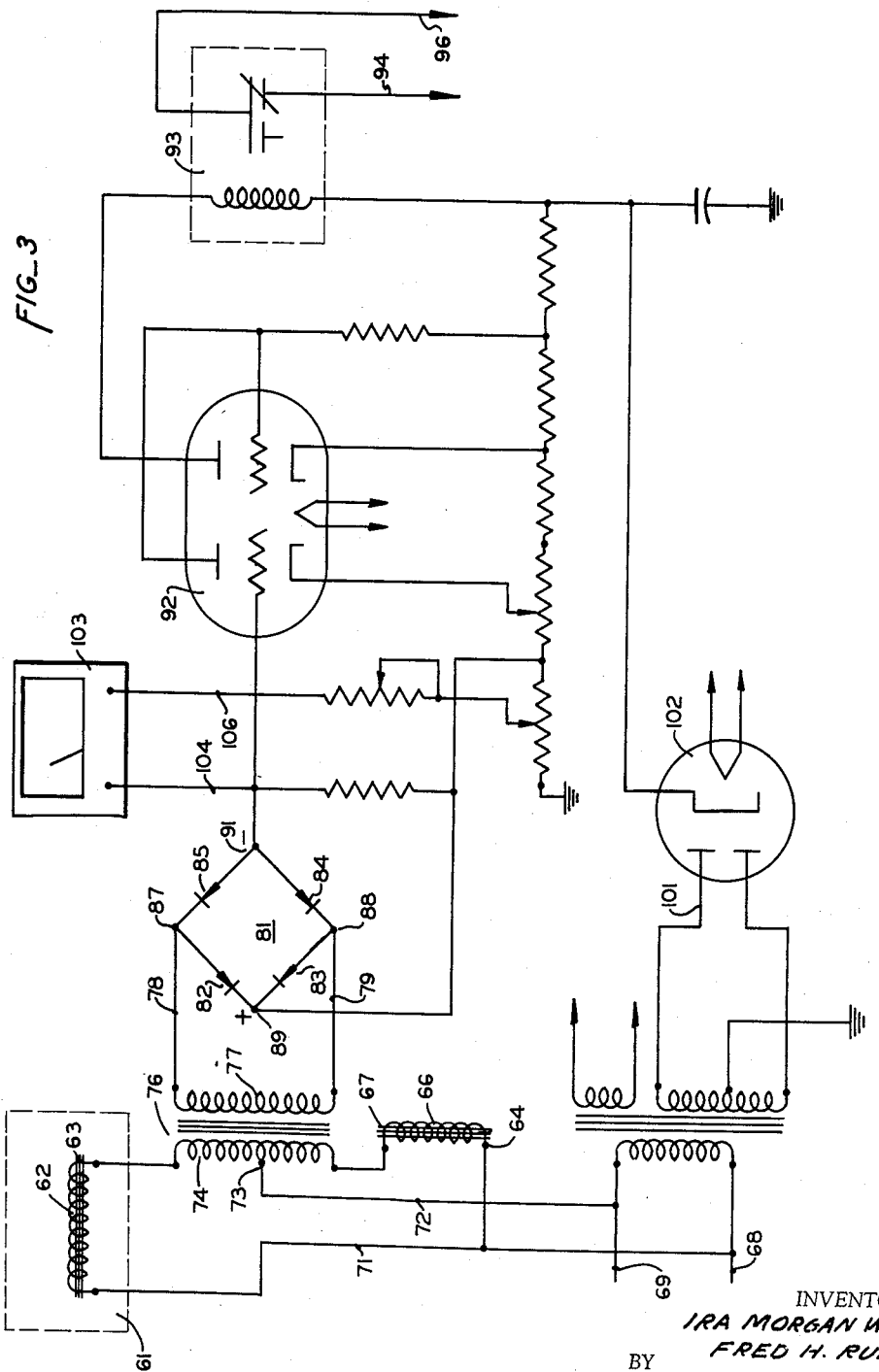

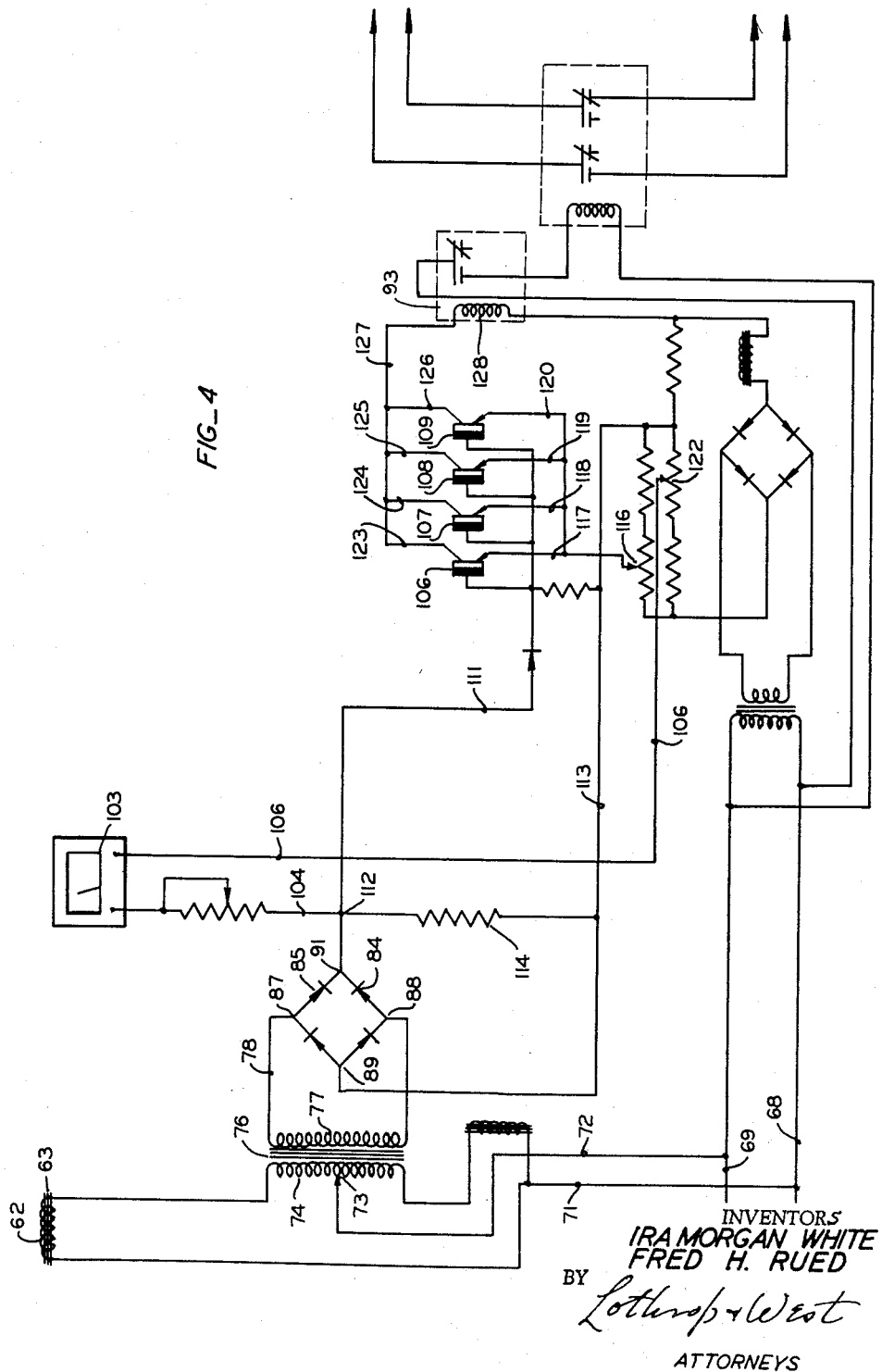

United States Patent Office 3,011,343
Patented Dec. 5, 1961

3,011,343
HYDRAULIC FLOW INDICATOR
Ira Morgan White, Berkeley, and Fred H. Rued, Lafayette, Calif., assignors to Baldwin-Lima-Hamilton Corporation, a corporation of Pennsylvania
Filed Oct. 21, 1957, Ser. No. 691,466
1 Claim. (Cl. 73—210)

Our invention relates to means for continuously indicating on a meter or alarm device or the like the relative quantity of hydraulic flow then occurring in a conduit or pipeline.

While various forms of flow indicators are available it is desirable to have one which is effective with relatively large equipment and of a sturdy and reliable although quite accurate nature. In field installations of large hydraulic equipment, such as in hydro-electric power houses, it is often necessary for the equipment to operate over months at a time without any particular supervision and certainly no technical servicing. At the same time, it is desirable to have a reasonably accurate indication of the quantity of hydraulic flow. It is also advisable to have a flow indicator of a nature which can readily be installed in or removed from a conduit without interfering substantially with any remaining structures associated therewith.

An object of the invention is to provide an improved flow indicator having favorable charactistics in the items mentioned.

Another object of the invention is to provide a flow indicator which can readily be comprised of units many of which are now individually standard.

A further object of the invention is to provide a flow meter which will be initially accurate and will maintain its accuracy over an indefinite period.

Other objects together with the foregoing are attained in the embodiment of the invention described in the accompanying description and illustrated in the accompanying drawings in which:

FIGURE 1 is a cross section on a longitudinal, vertical plane through the housing and associated mechanism of a flow indicator of our invention.

FIGURE 2 is a cross section the planes of which are indicated by the lines 2—2 of FIGURE 1.

FIGURE 3 is a diagram showing the schematic electrical layout of the sensing and indicating portions of our hydraulic flow indicator.

FIGURE 4 is a diagram like FIGURE 3 but shows an alternate wiring scheme.

While this device can readily be constructed in a number of variant forms, particularly dependent upon its intended use and environment, it has been with considerable success utilized as shown herein in a conduit or pipeline having a nominal one inch diameter. In this installation, hydraulic flow occurs in the direction of the arrows 6 and 7 of FIGURE 1, these being shown on a common axis 8 preferably disposed as nearly horizontally as possible. Appropriately connected to the pipes (not shown), which confine the hydraulic fluid flowing in the direction of the arrows 6 and 7, is a housing 9 preferably of metal such as cast steel. This housing is a substantially complete enclosure divided into an inlet compartment 11 and an outlet compartment 12 by an intervening barrier wall 13. This wall is formed to provide an orifice 16 of approximately the same diameter as the inlet 18 to the compartment 11 and as the outlet 19 from the compartment 12. The axis 21 of the orifice 16 is substantially at right angles to the axis 18 and is as nearly as possible in a vertical direction. The orifice 16 is carefully formed of a uniform nature and a precise diameter.

Disposed within the compartment 12 of the housing is a lever 23. This is conveniently of metal such as cast iron or steel and is provided with a fulcrum shaft 24 spanning the housing 9 and carried in anti-friction bushings 26 and 27 arranged in the side walls 28 and 29 of the housing. Removable plugs 31 and 32 normally close off the ends of the shaft 24 but can be removed for access thereto or removal of the shaft itself. The lever 23 has a fairly massive arm 34 extending over the orifice 16 and terminating in a plug 36 having a special superficial contour 37. That is, the plug 36 is characterized by a particular contour so that as the lever arm 34 swings about the fulcrum axis 24, the plug 36 enters into and recedes from the orifice 16, with substantially equal annular areas of the orifice being exposed for equal increments of movement of the lever arm 34. Other relationships of lever position to orifice free area can be achieved by appropriate contour of the plug 36. In one extreme position, an annular seat 38 on the lever surrounding the plug 36 rests upon the upper surface 39 of the barrier wall 13.

The lever 23 has another arm 41 which is approximately at right angles to the arm 23 and terminates at its uppermost end in a body 42 of material such as iron having the property of influencing a magnetic field or perturbing such a field by its presence and according to its position. The body 42 has an arcuate upper surface 43 concentric with the axis of the pivot or fulcrum shaft 24 and also has tapered portions 44 and 46 to reduce the mass of the material of the body 43.

Forming part of the housing 9 and particularly serving partially as a closure for the compartment 12 thereof, is a plate 47 of material which is permeable to a magnetic field but does not especially perturb such a field. Suitable metals are brass, copper and stainless steel. The plate 47 seats upon a peripheral flange 49 on the housing 9 with an intervening gasket 51. A closure rim 52 rests upon the plate 47 and securing means such as machine screws 53 are appropriately engaged with the rim 52 and the flange 49 so as to make a liquid tight joint between the plate 47 and the remaining portion of the housing 9. In this fashion a water-tight casing is provided with flow travelling from the inlet 18 to the outlet 19 through the orifice 16. This flow provides an effective force to lift the arm 23 in a counter-clockwise direction, when seen in FIGURE 1. The path of movement of the arm 34 is such that the lifting thereof by the flow of water is resisted by a substantially constant force due to gravity. The characterized plug 36, however, insures that the displacement of the lever is substantially proportional in a straightline fashion with the quantity of water or other liquid flowing through the orifice 16. Thus, the position of the body 43 is an indication of the amount of flow through the orifice 16.

Pursuant to our invention, means are provided for sensing the instantaneous position of the body 42 with respect to the housing 9 and for affording an indication thereof. This is done without recourse to any stuffing glands or transmission numbers subject to friction which might affect the accuracy of the result and which might provide various impediments to proper operation at different flow rates.

In accordance with this arrangement, there is mounted on the housing 9 particularly on the plate 47 thereof a part of an electrical mechanism illustrated diagrammatically in FIGURE 3. Included in the electro-mechanical structure is a choke 61 having a coil 62 and a core 63. This choke 61 is substantially identical with a companion choke 64 having a duplicate coil 66 and a duplicate core 67. The two chokes 61 and 64 are connected in parallel with each other and across an alternating current power supply having conductors 68 and 69. Connections are made to the pair of chokes by leads 71 and 72. The lead 72 is joined at a center tap 73 to the primary winding 74 of a transformer, generally designated 76.

When the circuit including the conductors 68 and 69 and the two chokes 61 and 64 is completed, the chokes are equally provided with electromotive force and since this is of an alternating character, both chokes set up surrounding magnetic fields. The choke 64 is entirely stationary and has no movable parts near it to disturb its substantially constant (although alternating) magnetic field. The choke 61, being in close proximity to the path of the body 42, is necessarily affected as to its alternating magnetic field by the particular position of the body. The instantaneous position of the body 42 causes a corresponding or characteristic perturbation of the magnetic field of the choke 61. It thus transpires that the quantity of flow through the housing 9 is directly represented by the particular perturbation of the magnetic field of the choke 61. As the two chokes 61 and 64 buck each other, their effects cancel each other except for the perturbation in one of them which results in a corresponding current. Because of the connection to the transformer 76 through the center tap, the perturbation current produces a similar and corresponding variation primary magnetic field and so a corresponding response in the secondary coil 77 of the transformer 76.

The opposite ends of the secondary coil 77 are connected by leads 78 and 79 to diagonally opposite points of a bridge circuit 81. This is made up of appropriate connectors and includes four diodes 82, 83, 84 and 85, one in each of the bridge legs. Since the leads 78 and 79 are connected at the diagonally opposite points 87 and 88, the intervening points 89 and 91 of the bridge are joined to an appropriate standard amplifier 92 and to a standard relay 93 extending to conductors 94 and 96 joined to an indicator or alarm (not shown).

The conductors 68 and 69 are coupled to a suitable power supply generally designated 101, including a source 102 of direct current so that the standard amplifier 92 is appropriately powered. An appropriate direct current meter 103 is connected by leads 104 and 106 in such a way (as shown) as to indicate the relative position of the body 42 in the housing 9 and thus to afford a direct reading of the quantity of flow through the orifice 16. The response of the meter 103 is directly indicative of the amount of magnetic perturbation induced in the choke 61 by the body 42 as compared with the unperturbed magnetic field of the choke 64. It will be observed that the meter 103 actually shows the unbalance of the bridge 81 at any particular time. There is afforded not only a visual indication of the amount of flow but the indicator relay 93 actuates any responsive mechanism.

In some instances it is considered advisable to avoid the warm-up time and some unavoidable time variations inherent in thermionic tubes. Under those circumstances an arrangement substantially as illustrated in FIGURE 4 is provided. The first part of the circuit is substantially the same as previously illustrated with the exception of standard variations and is effective to indicate the condition of the points 89 and 91 of the bridge by means of the indicator 103. This same bridge condition, however, is amplified for use by the relay 93 not through vacuum tubes but through a group of transistors 106, 107, 108 and 109. These units are connected in common to a lead 111 which extends from the point 91 of the bridge and is connected at 112 to the meter lead 104. The other side of the bridge condition as indicated at the point 89 is conducted to another terminal of the transistors by a conductor 113. A resistor 114 is interposed between the conductors 111 and 113. The conductor 113 extends through a resistance adjustor 116 to branch to leads 117, 118, 119, and 120 connecting the transistors in parallel. The conductor 113 extends through an adjusting mechanism 122 to the lead 106. The output of the transistors 106, 107, 108, and 109 is through parallel leads 123, 124, 125, and 126 to a conductor 127 joined to the actuating coil 128 of the relay 93. The remaining portions of the circuit are substantially standard. With this layout the transistors serve to amplify the condition of the bridge terminals 89 and 91 to be effective upon the relay 93. Several transistors are utilized in parallel so that there will not only be adequate energy to actuate the relay but so that if one or possibly even two of the transistors fails the remaining ones will still have adequate output to operate the relay 93. This circuit arrangement not only operates instantly when turned on initially but remains stable over a protracted period of time and is not adversely affected by occasional failure of a transistor since the remaining ones are effective to actuate the coil. Any transistor can be changed at any time without substantially affecting the operation of the remaining part of the circuit.

In accordance with this mechanism therefore there is provided a hydraulic flow meter which operates with very little resistance and with substantially no friction and with very little variation in its operation from time to time, being effective to afford an indication or an operation responsive to the quantity of flow and very accurately consistent because of the absence of springs, packing boxes, friction devices and the like.

What we claim is:

A hydraulic flow indicator comprising a housing having a magnetically permeable horizontal wall and having an outlet, means forming an inlet to said housing and connecting said inlet to an orifice opening vertically upwardly into the interior of said housing, means in said housing spaced from said orifice for establishing a horizontal fulcrum, a substantially horizontal first lever arm mounted at one end to pivot on said fulcrum within said housing, a characterized plug on the other end of said first lever arm and disposed to move into and out of said orifice as said first lever arm pivots on said fulcrum, a substantially vertical second lever arm incorporated at one end with said first lever arm and upstanding therefrom also to pivot on said fulcrum within said housing, a body capable of perturbing a magnetic field mounted on the upper end of said second lever arm within said housing and located beneath and close to said permeable wall, a choke on the outside of said housing close to said permeable wall and substantially directly above said body for establishing a magnetic field subject to perturbation by said body, and means responsive to perturbations in said magnetic field for giving an indication thereof.

References Cited in the file of this patent

UNITED STATES PATENTS

| | | |
|---|---|---|
| 963,643 | Pendleton | July 5, 1910 |
| 1,027,250 | Hartung | May 21, 1912 |
| 1,292,334 | Larsen | Jan. 21, 1919 |
| 1,490,901 | Hendricks | Apr. 15, 1924 |
| 1,499,839 | Nicholson | July 1, 1924 |
| 1,962,795 | Walker | June 12, 1934 |
| 2,029,633 | Muhleisen | Feb. 4, 1936 |
| 2,307,304 | Rudd | Jan. 5, 1943 |
| 2,380,399 | Bowie | July 31, 1945 |
| 2,431,722 | Xenis | Dec. 2, 1947 |
| 2,629,089 | Fairbairn et al. | Feb. 17, 1953 |
| 2,820,364 | Bevins et al. | Jan. 21, 1958 |

FOREIGN PATENTS

| | | |
|---|---|---|
| 924,784 | France | Mar. 17, 1947 |